United States Patent [19]  [11] 3,876,569
Priest et al.  [45] Apr. 8, 1975

[54] HIGH RESILIENCY POLYURETHANE FOAMS CONTAINING ARYLAMINE LOAD BEARING ADDITIVES

[75] Inventors: David C. Priest, Charlotte, N.C.; George T. Kwiatkowski, Green Brook, N.J.

[73] Assignee: Union Carbide Corporation, New York, N.Y.

[22] Filed: Feb. 11, 1974

[21] Appl. No.: 441,036

Related U.S. Application Data

[63] Continuation-in-part of Ser. No. 402,087, Oct. 1, 1973, abandoned, which is a continuation of Ser. No. 273,548, July 20, 1972, abandoned.

[52] U.S. Cl.................. 260/2.5 AM; 260/2.5 BE; 260/77.5 AM
[51] Int. Cl...................... C08g 22/44; C08g 22/02
[58] Field of Search... 260/2.5 AM, 2.5 AZ, 77.5 AM

[56] References Cited
UNITED STATES PATENTS

| | | | |
|---|---|---|---|
| 3,188,302 | 6/1965 | Lorenz | 260/2.5 AM |
| 3,194,793 | 7/1965 | Kogon | 260/2.5 AM |
| 3,523,464 | 8/1970 | Quillery | 260/2.5 AZ |
| 3,523,918 | 8/1970 | Gonzalez | 260/2.5 AZ |
| 3,563,906 | 2/1971 | Hoeschle | 260/2.5 AM |
| 3,580,869 | 5/1971 | Rhodes | 260/2.5 AM |
| 3,598,748 | 8/1971 | Hirosawa | 260/2.5 AM |
| 3,635,851 | 1/1972 | Hoeschle | 260/2.5 AM |
| 3,644,235 | 2/1972 | Gray | 260/2.5 AM |
| 3,691,265 | 9/1972 | Cobbledick | 260/2.5 AM |
| 3,729,370 | 4/1973 | Cobbledick | 260/2.5 AM |
| 3,736,295 | 5/1973 | Meckel | 260/77.5 AM |
| 3,738,947 | 6/1973 | Fishbein | 260/2.5 AM |
| 3,752,790 | 8/1973 | McShane | 260/2.5 AM |
| 3,772,222 | 11/1973 | Steward | 260/2.5 AM |
| 3,775,350 | 11/1973 | Junas | 260/2.5 AM |
| 3,816,360 | 6/1974 | Taub | 260/2.5 AM |
| 3,823,096 | 7/1974 | Fabris | 260/2.5 AM |
| 3,826,763 | 7/1974 | Lamplug | 260/2.5 AM |

OTHER PUBLICATIONS

Gray, "High Resilience, Flame Resistant Polyether Urethane Foams," Journal of Cellular Plastics; July/August 1972; pages 214–217.

*Primary Examiner*—Melvyn I. Marquis
*Assistant Examiner*—C. Warren Ivy
*Attorney, Agent, or Firm*—Bernard Francis Crowe

[57] ABSTRACT

Polyurethane foams having enhanced foam load building characterized have been developed by incorporating arylamine load building additives in conventional high resiliency polyurethane foam formulations.

20 Claims, No Drawings

HIGH RESILIENCY POLYURETHANE FOAMS CONTAINING ARYLAMINE LOAD BEARING ADDITIVES

This is a continuation-in-part of Ser. No. 402,087 filed Oct. 1, 1973, which in turn is a continuation of Ser. No. 273,548 filed July 20, 1972, both applications are now abandoned.

BACKGROUND OF THE INVENTION

This invention pertains to polyurethane resilient foams having enhanced foam load building characteristics and, particularly, to cold cure polyurethane foams containing aromatic amines derived from chlorinated polyphenyls and para-aminophenol or phenol-formaldehydeaniline resins.

Polyurethane high resiliency foams having desirable foam load building characteristics have been prepared in the past from formulations containing:

1. an aromatic polyisocyanate,
2. a polyol,
3. a curing catalyst
4. a blowing agent,
5. a surfactant, and
6. a load-building additive.

For the past several years, extensive use has been made of such foam load-building additives as methylenebis(ortho-chloroaniline) and a related aniline-modified complex formed as the condensation product of three mols of chloroaniline, 1 mol of aniline and 2 mols of formaldehyde. The latter had the advantage of being a viscous pourable liquid which was soluble in the polyols used in the polyurethane formulation. These additives, however, are comparatively expensive and add to the overall cost of the polyurethane foam composition. Due to the ever-continuing trend towards lowering of synthetic foam composition costs, it is desirable to substitute more economical load building additives in high resiliency foams as direct replacements for the currently available additives.

This end has been achieved by utilizing conventional polyurethane high resiliency foam compositions in conjunction with the novel aromatic amines described hereinafter.

SUMMARY OF THE INVENTION

A method for preparing load-bearing, high resiliency polyurethane foams has been discovered which comprises inter-reacting a mixture of at least one organic polyisocyanate and at least one polyol in the presence of a blowing agent with about 0.5 to about 20 percent by weight, based on the weight of polyol, of an arylamine having a formula selected from the group consisting of

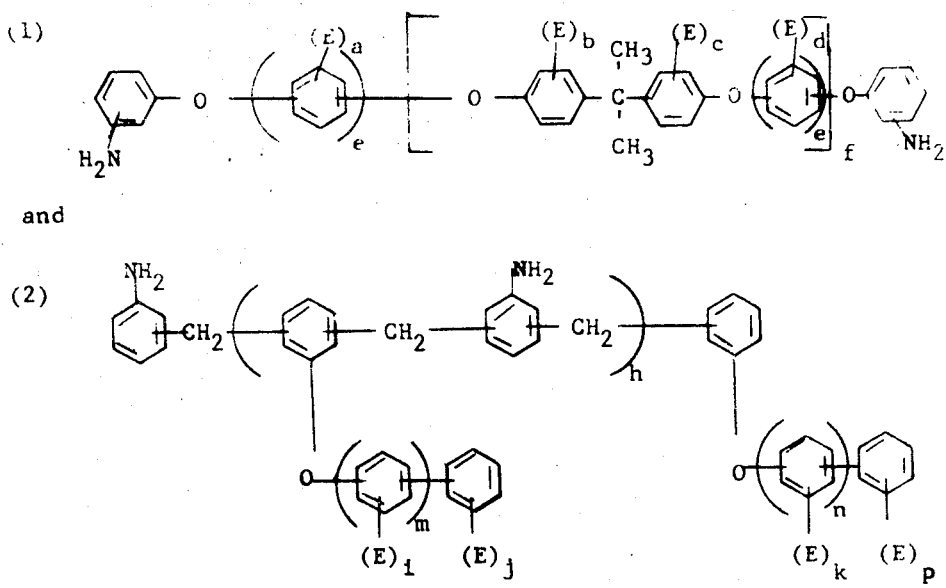

wherein E is a halogen selected from the group consisting of fluorine, chlorine and bromine, $a, b, c, d, e, g, i,$ and $k$ are each integers having values of 1 to 4, $m$ and $n$ are integers having values of 0 to 4, $j$ and $p$ are integers having values of 1 to 5, $f$ is an integer having values of 0 to 2, $h$ is an integer having average values of 0 to about 5.

DESCRIPTION OF THE INVENTION

The polyols useful in this invention can be an hydroxyl-terminated polyester, a polyhydroxy alkane, a polyphenol, a polyoxyalkylene polyol or the like. Among the polyols which can be employed are one or more polyols from the following classes of compositions alone or in admixture, known to those skilled in the polyurethane art, such as:

a. alkylene oxide adducts of polyhydroxy alkanes;
b. hydroxyl-terminated polyester;
c. alkylene oxide adducts of non-reducing sugars and sugar derivatives;
d. alkylene oxide adducts of phosphorous and polyphosphorous acids;
e. alkylene oxide adducts of polyphenol;
f. the polyols from natural oils such as castor oil, and the like.

Illustrative alkylene oxide adducts of polyhydroxyalkylalkanes include, among others, the alkylene oxide adducts of ethylene glycol, propylene glycol, 1,3-dihydroxy propane, 1,3-dihydroxy butane, 1,4-di hydroxy butane, 1,4-, 1,5- and 1,6-dihydroxyhexane, 1,2-, 1,3-, 1,4-, 1,6- and 1,8-dihydroxy octane, 1,10-dihydroxy decane glycerol, 1,2,4-trihydroxy butane, 1,2,6-trihydroxy hexane, 1,1,1-trimethylolethane, 1,1,1-trimethylol propane, pentaerythritol, xylitol, arabitol, sorbitol, mannitol, and the like; as well as adducts of ethylene oxide, propylene oxide, epoxy butane, or mixtures thereof. A preferred class of alkylene oxide adducts of polyhydroxy alkenes are the ethylene oxide, propylene oxide, butylene oxide, or mixtures thereof and adducts of trihydroxy alkenes.

Illustrative hydroxyl-terminated polyesters are those which are prepared by polymerizing a lactone in the presence of an active hydrogen-containing starter as disclosed in U.S. Pat. No. 2,914,556.

A further class of polyols which can be employed are the alkylene oxide adducts of the nonreducing sugars, wherein the alkylene oxides contain from two to four carbon atoms. Among the nonreducing sugars and sugar derivatives contemplated are sucrose, alkyl glycosides, such as methyl glucosides, ethyl glucosides, and the like, glycol glucosides, such as, ethylene glycol glucosides, propylene glycol glucosides, glycerol glucoside, 1,2,6-hexanetriol glucoside, and the like, as well as the alkylene oxide adducts of the alkyl glycosides as set forth in U.S. Pat. No. 3,083,788.

A still further class of polyols which can be used are the polyphenols and preferably the alkylene oxide adducts thereof wherein the alkylene oxides have from two to four carbon atoms. Among the polyphenols which are contemplated are found, for example, bisphenol A, bisphenol F, condensation products of phenol and formaldehyde, the novolac resins, condensation products of various phenolic compounds and acrolein, the simplest member of this class being the 1,1,3-tris(hydroxyphenyl) propanes, condensation products of various phenolic compounds and glyoxal, glutaraldehyde, and other dialdehydes, the simplest members of this class being the 1,1,2,2-tetrakis(hydroxyphenyl) ethanes, and the like.

The alkylene oxide adducts of phosphorous and polyphosphorous acids are another useful class of polyols. Ethylene oxide, 1,2-epoxy propane, the epoxy butanes, 3-chloro-1,2-epoxy propane, and the like are preferred alkylene oxides. Phosphoric acid, phosphorous acid, the polyphosphoric acids such as tripolyphosphoric acids, the polymetaphosphoric acids and the like are desirable for use in this connection.

The polyols employed can have hydroxyl numbers that vary over a wide range. In general, the hydroxyl number of the polyols employed in this invention can range from about 20, and lower, to about 1,000, and higher, preferably, from about 25 to about 600, and more preferably, from about 25 to 450. The hydroxyl number is defined as the number of milligrams of potassium hydroxide required for the complete hydrolysis of the fully acetylated derivative prepared from one gram of polyol. The hydroxyl number can also be defined by the equation:

$$OH = \frac{56.1 \times 1000 \times f}{m.w.}$$

wherein
OH=hydroxyl number of the polyol
$f$=functionality, that is, average number of hydroxyl groups per molecule of polyol,
m.w.=molecular weight of the polyol.

It is preferred that polyols having an hydroxyl number of from about 25 to about 70 or more be employed in these formulations. Such limits are not intended to be restrictive, but are merely illustrative of the large number of possible combinations of the above polyol co-reactants.

Preferably, the polyols have viscosities of from 100 to 2,000 centipoises at 25° C. and are the ethylene and/or propylene oxide adducts of dihydroxy alkanes or trihydroxy alkanes.

As an extension of this invention, fluid polymer/polyol compositions can be used in place of the straight polyols described hereinabove.

The polymer/polyols useful in producing polyurethane resilient foams of this invention are known materials. Such compositions are fluids which can be prepared by polymerizing in the presence of a free radical catalyst and at a temperature at which the half life of the catalyst is no longer than 6 minutes: (1) from 10 to 45 weight percent of a monomer mixture of (a) from about 50 to about 100 weight percent of acrylonitrile or methacrylonitrile and (b) from 0 to about 50 weight percent of styrene or alpha methylstyrene, said weight percents of the nitrile and styrene or alpha methylstyrene being based on the total weight of these materials, dissolved or dispersed in (2) from about 55 to about 90 weight percent of a normally liquid polyol, said weight percents of the monomer mixture and polyol being based on the total weight of the monomer and the polyol.

The catalysts useful in producing polymer/polyol composition for this invention are well known free radical initiators which catalyze the polymerization of vinyl monomers, for example, peroxide such as hydrogen peroxide, dibenzoyl peroxide, acetyl peroxide, benzoyl hydroperoxide, t-butyl hydroperoxide, di-t-butyl peroxide, lauroyl peroxide, butyryl peroxide, and the like; azo compounds such as azo-bisisobutyronitrile, and the like; per compounds such as persulates, perborates, persuccinic acid, diisopropyl peroxide dicarbonate, and the like. The preparation of polymer/polyol composition can be carried out in the presence of an inert organic solvent. Examples of such solvents include toluene, benzene, acetonitrile, ethyl acetate, hexane, heptane, dicyclohexane, dioxane, acetone, and the like.

The only requirement in the selection of the solvent and the polyol is that neither interfere with the polymerization of the monomer selected. When an inert organic solvent is used, it is generally removed from the reaction mixture by conventional means before the polymer/polyol is used to produce the polyurethane resilient foams of this invention.

Temperature used in producing the polymer/polyol compositions used in this invention is any temperature at which the half life of the catalyst is no longer than 6 minutes (preferably no longer than about 1.5 to 2.0 minutes). The half lives of the catalyst become shorter as the temperature is raised. The maximum temperature used is not narrowly critical but should be lower than the temperature at which significant decomposition of the reactants or product occurs.

The half lives of such catalysts are known properties measured by known methods. The half lives are conventionally measured while the catalyst is dissolved in a solvent that is substantially non-reactive with the catalyst and that does not decompose the catalyst. Such solvents include liquid hydrocarbons and liquid halohydrocarbons.

In preparing polymer/polyol composition for this invention, it is preferred that the monomers be soluble in the polyol used. It has been found that first dissolving the monomer in a minor porportion of the polyol and adding the solution so formed to the remainder of the polyol at reaction temperature facilitates mixing of the monomers in the polyol and greatly reduces or eliminates reactor fouling.

The organic polyisocyanates that are useful in producing resilient polyurethane foams of this invention are organic compounds that contain at least two isocyanato groups. Such compounds are well known to those skilled in the art of producing polyurethane foams. Preferred polyisocyanates are diisocyanates such as o-, m- and p-phenylene diisocyanates, 2,4- and 2,6-tolylene diisocyanates, 4,4'-biphenylene diisocyanates, 3,3'-dimethyl-4,4'-biphenylene diisocyanate, 3,3'-dimethoxy-4,4'-biphenylene diisocyanate, p,p'-bibenzyl diisocyanate, p,p'-diphenylmethane diisocyanate, 4,4'-methylene bis(o-tolyl isocyanate), 1,5-naphthalene diisocyanate, and the like. The publication of Siefken (Annalen 562, pages 122, 135, 1949) lists numerous other diisocyanates which are useful in this invention.

Catalysts that are useful in producing resilient polyurethane foams in accordance with this invention include:

a. tertiary amines such as triethylenediamine, bis-(dimethylamino ethyl)ether, trimethylamine, triethylamine, N-methylmorpholine, N-ethylmorpholine, N,N-dimethylbenzylamine, N,N-dimethyl ethanolamine, and the like;

b. tertiary phosphines, such as, trialkyl phosphines, dialkyl benzyl phosphines, and the like;

c. strong bases such as alkaline and alkali earth metal hydroxides, and phenoxides;

d. acidic metal salts of strong acids such as ferric chloride, stannic chloride, stannous chloride, antimony trichloride, bismuth nitrate and chloride and the like;

e. chelates of various metals such as those obtained from acetylacetone, benzoyl acetone, ethyl acetoacetate and the like.

f. alcoholates and phenolates of various metals such as $Ti(OR)_4$, $Sn(OR)_4$, $Sn(OR)_2Al(OR)_3$, and the like wherein R is alkyl or aryl and the like;

g. salts of organic acids with a variety of metals such as alkali metals, alkaline earth metals, Al, Sn, Mn, Pb, Co, Ni, and Cu, including, for example, sodium acetate, potassium laurate, calcium hexanoate, stannous acetate, stannous octanoate, stannous oleate, lead octanoate, metallic dryers such as manganese and cobalt naphthenates, and the like;

h. organic metallic derivatives of tetravalent tin trivalent and pentavalent arsenic, antimony and bismuth, and metal carbonyls of iron, cobalt and nickel.

The resilient polyurethane foams of this invention are prepared by a so-called "one-step" method which involves reacting a polyhydroxy compound with at least one polyisocyanate in the presence of a blowing agent, such as, water, a liquefied gas or the like. It is also desirable to conduct the reaction in the presence of a catalyst and surfactants. In general it is desirable to employ at least one — NCO equivalent (group) per hydroxyl equivalent (group) in the preparation of urethane foamed products.

As indicated previously various blowing agents such as water and halogenated hydrocarbons can be employed in the preparation of the forming of this invention. The preferred blowing agents are water and certain halogen-substituted aliphatic hydrocarbons which have boiling points between about −40°C. and 70°C. and which vaporize at or below the temperature of the foaming mass. Illustrative, are for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-1-fluoromethane, 1,1-difluoro-1,2,2-trichloroethane, chloropentafluoroethane, 1-chloro-1-fluoroethane, 1-chloro-2-fluoroethane, 1,1,2-trifluoroethane, 2-chloro-1,1,1,2,3,3,4,4,4-nonafluorobutane, hexafluorocyclobutane and octafluorobutane. Other useful blowing agents include lowboiling hydrocarbons such as butane, pentane, hexane, cyclohexane and the like. Many other compounds easily volatilized by the exotherm of the isocyanato-hydroxy reaction can also be employed.

The amount of blowing agent used will vary with the density desired in the foamed product. In general, it may be stated that for 100 grams of reaction mixture containing an average isocyanato/reactive hydrogen ratio of about 1:1, about 0.005 to 0.3 mols of gas are used to provide densities ranging from 1 to 30 pounds per cubic foot, respectively.

When water is employed as a blowing agent, it is preferred to use about 0.5 to about 5% water based upon the total weight of the urethane foaming composition.

In producing foamed reaction products, it is also within the scope of the invention to employ small amounts, i.e., of 0.001 percent to about 5.0 percent by weight based on the total urethane foaming reaction mixture, of an emulsifying agent or surfactant. Suitable surfactants include a foaming stabilizer as for example a "Pluronic" hydrolyzable polysiloxane-polyoxyalkylene block copolymer such as block copolymers described in U.S. Pat. No. 2,834,748 and 2,917,480. Another useful class of emulsifying agent or surfactants are the "non-hydrolyzable" polysiloxanes or polyoxyalkylene block copolymers such as those disclosed in U.S. Pat. No. 3,505,377. Per-methylated silicone oligomers such as Dow Corning DC-2005 centistoke silicone oil can also be used.

The arylamines designated by formula (1) supra used to improve the load building characteristics of the foams of this invention may be prepared by the following series of reactions:

1. formation of the sodium salt of p-aminophenol using sodium hydroxide in a solvent, such as, N-methylpyrolidinone and an azeotropic solvent, such as, xylene and in the presence of a halogenated aromatic compound;
2. azeotropic distillation of the water formed;
3. addition of a solution of a halogenated aromatic compound in the azeotropic solvent followed by distillation of the azeotropic solvent; and
4. completion of the condensation reaction at about 140°–170°C.

Preferred halogenated aromatic compounds include chlorinated benzene containing at least two chlorine substituents, such as hexachlorobenzene and the Aroclors (tradename of Monsanto Company for multichlorinated polyphenyls), such as Aroclor 1242 (42% chlorinated biphenyl), Aroclor 1254 (54% chlorinated biphenyl) and Aroclor 5460 (60% chlorinated terphenyl).

Other preferred halogenated aromatic compounds are polyhalogenated benzenes, such as, tetrachlorobenzene, hexabromobenzene, p-difluorobenzene, and the like; polyhalogenated biphenyls; such as, decabromodiphenyl; polyhalogenated terphenyls; and polyhalogenated tetraphenyls.

The arylamines designated by formula (2) supra can be prepared by substituting a phenol-formaldehyde-aniline resin represented by the formula:

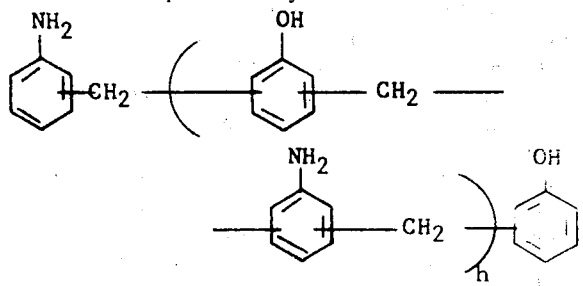

wherein $h$ is an integer having values of 0 to about 5 for p-aminophenol in the procedure used to make the aryl amines for formula (1).

More complex and higher molecular weight arylamines can be prepared by substituting bisphenols for a portion of the p-aminophenol or phenol-formaldehyde-aniline resin. Useful bisphenols include bisphenol A, bisphenol F, and the like.

In the practice of this invention it is preferred to use about 3 to about 5 percent by weight of arylamine load-building additive based on the weight of polyol used in the foam formulation, although about 0.5 to 20 percent can be used if desired.

The efficacy of the arylamines described above as load-building additives in resilient polyurethane foam compositions was demonstrated by the following test procedures:

| Test | Procedure |
|---|---|
| Indentation load deflection (ILD) | ASTM D-1564-69 |
| Compression load deflection (CLD) | " |
| Tensile strength | " |
| Elongation, percent | " |
| Tear resistance (strength) | " |
| Sac factor (or load ratio) | " |
| Resilience (% ball rebound) | " |
| Percent return (value) | " |
| 5 Hour humid age load loss | " |

Porosity of the polyurethane foams was determined as follows. A specimen of foam ½ inch in thickness was compressed between two pieces of flanged plastic tubing, 2 ¼ inch in diameter (ID). This assembly then becomes a component in an air flow system. Air at a controlled velocity was allowed to enter one end of the tubing, flow through the foam specimen and exit through a restriction at the lower end of the assembly. The pressure drop across the foam due to the restriction of air passage was measured be means of an inclined closed manometer. One end of the manometer was connected to the up stream side of the foam and the other end of the manometer to the down stream side. The flow of air on the up stream side was adjusted to maintain a differential pressure across the specimen of the 0.1 inches of water. The air porosity of the foam was recorded in units of air flow per unit of area of specimen, cubic feet per minute per square foot.

Density was measured in accordance with ASTM D1564-69.

Compression set (CS) both 50 and 75% was measured in accordance with ASTM D1564-69.

Exit represents the time (in seconds) it takes for the foam to start exuding from the mold. It is a measure of how well the foam composition has been catalyzed.

POP given in seconds represents the time required for the foam to stop exuding from the mold.

Basal cell is a subjective term used to describe the cell structure at the base of the foam.

The invention is further described in the Examples, procedures and preparations which follow. All parts and percentages are by weight unless otherwise specified.

FOAMING PROCEDURE

The general procedure used for the preparation of the polyurethane foams of this invention is as follows.

The amine additive to be employed was admixed with a portion of the polyol to be used in the foam preparation. Ten percent mixtures of the arylamine additive in the polyol were prepared, although other concentrations may be used with equal effect. The admixture of arylamine in polyol was warmed while stirring until solution was visually ascertained. Usually heating to 60° to 90°C. was sufficient for rapid and complete solution. The polyol-arylamine solution was then cooled to room temperature with such solution being stable to crystallization for indefinite periods of time.

A sufficient amount of the polyol-arylamine solution was added to a one-half gallon container to achieve the desired level of the amine. The following components were then added in non-critical order to the container: additional polyol (to desired level), distilled water, surfactant, and all catalyst components. This mixture was then agitated for 60 seconds with a 2 ½ inch six blade turbine stirrer positioned one inch from bottom of container. The mixing speed was 4,000 rpm. The container was removed from the mixing apparatus and the required amount of isocyanate was then added directly to the container. Stainless steel baffles were then placed in the container (to control mixing and mitigate splashing from the container of low viscosity isocyanate) and mixing was continued for five seconds. A sufficient amount of the foaming mixture was then poured into an aluminum mold having a vented hinged lid after a mold release agent had been applied to all interior mold surfaces. The lid was clamped to the body of the aluminum mold with two to four "C" clamps. The mold has interior dimensions of 15 × 15 × 4 inches. The aluminum lid has four to five ¼ inch diameter vent holes. While the formulation components were normally maintained at room temperature (23°C.), the mold temperature can vary from 100° to 140°F. These foams used in these examples were prepared with the mold temperature maintained at 140°F. After a 10 minute residence time in the mold, the foam sample was removed and crushed by passing through steel rollers with ½ inch clearance between rollers. After 7 days " cure" at ambient temperatures, the molded foam samples were submitted for physical property evaluation.

SYNTHESIS OF ARYLAMINE LOAD BUILDING ADDITIVES Arylamine I Derived from Aroclor 5460

To a 2 liter, 4 neck flask equipped with a Dean stark trap, condenser, nitrogen inlet tube and thermometer was added 110.0 grams (1.008 mole) p-aminophenol and 500 ml. of toluene. The system was purged with nitrogen and 400 ml. of dimethysulfoxide added. The system was purged again with nitrogen and 81.5 grams (1.05 mole) of 49.15% aqueous sodium hydroxide added. The solution was heated to 110°–120°C. and water removed via the toluene/water azeotrope. After complete dehydration (approximately 4–5 hours), toluene was removed until the pot temperature reached 135°C.

A concentrated solution of Aroclor 5460 (274 grams) (0.5 mole) in 250 ml. of hot toluene was added via an addition funnel. The remaining toluene was then distilled off. The pot was heated to 160°C. and maintained 1 hour before cooling to room temperature.

At room temperature, the reaction mixture was vacuum filtered to remove sodium chloride and coagulated. Coagulation was accomplished by pouring the filtrate slowly into distilled water (1 to 10 of water) contained in a 3 liter blender and stirred at a high speed. Vacuum filtration through a fritted glass funnel afforded a dark colored diamine. The diamine was washed further with hot distilled water, then dried at 60°C. under vacuum.

The dried diamine (76% yield) was dark brown in color and had a titrated amine equivalent of 365. The chlorine content by elemental analysis was 36.2%. The mass spectrum indicated the product was composed of 9 amines:

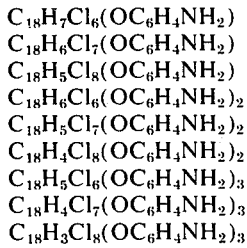

ARYLAMINE II DERIVED FROM AROCLOR 4465

To a 5 liter, 3 neck flask equipped with a Dean Stark trap, condenser, nitrogen inlet tube and thermometer was added 229.1 grams (2.1 mole) of p-aminophenol and 1 liter of toluene. The system was purged with nitrogen and 975 ml. of dimethyl sulfoxide added. The system was purged again with nitrogen and 166.8 grams (2.05 mole) of 49.15% aqueous sodium hydroxide added. The solution was heated to 110°–120°C. and water removed via the toluene/water azetrope. After complete dehydration (approximately 4–5 hours), toluene was removed until the pot temperature reached 130°C.

A concentrated solution of 500 grams commercial Aroclor 4465 (500 MW) (1.0 mole) in 300 ml. of hot toluene was added via an addition funnel. The remaining toluene was then distilled off. The pot was heated to 160°–165°C. and maintained for 2 hours before cooling to room temperature.

At room temperature, the reaction mixture was vacuum filtered to remove sodium chloride and recovered as in the above example.

A 616 gram yield of a product with a titrated amine equivalent of 344 was obtained, m.p. 88°–92°C.

ARYLAMINE III DERIVED FROM AROCLOR 5460

To a 2 liter, 4 neck flask equipped with a Dean Stark trap, condenser, nitrogen inlet tube and thermometer was added 110.0 grams (1.008 mole) p-aminophenol and 500 ml. of toluene. The system was purged again with nitrogen and 81.54 grams (1.00 mole) of 49.05% acqueous sodium hydroxide added. The solution was heated to 110°–120°C. and water removed via the toluene/water azetrope. After complete dehydration (approximately 4–5 hours), toluene was removed until the pot temperature reached 135°C.

A concentrated solution of 276.25 grams (MW 552.5) Aroclor 5460 (0.5 mole) in 250 ml. of hot toluene was added via an addition funnel. The remaining toluene was then distilled off. The pot was heated to 160°C. and maintained 1 hour before cooling to room temperature.

At room temperature, the reaction mixture was coagulated. Coagulation was accomplished by pouring the filtrate slowing into distilled water (1 to 10 of water) contained in a 3 liter blender and stirred at a high speed. Vacuum filtration through a fritted glass funnel afforded a dark colored diamine. The diamine was washed further with hot distilled water, then dried at 60°C. under vacuum.

A 292 gram yield of diamine (80% yield) was obtained which was dark brown in color and had a titrated amine equivalent of 366. The chlorine content by elemental analysis was 36.2%. The melting point was 107°–128°C.

ARYLAMINE IV OLIGOMER DERIVED FROM AROCLOR 5460

To a 2 liter, 4 neck flask equipped with a Dean Stark trap, condenser, nitrogen inlet tube and thermometer was added 60.02 grams (0.55 mole) of p-aminophenol, 57.08 grams (0.25 mole) of Bisphenol A and 500 ml. of toluene. The system was purged with nitrogen and 450 ml. of dimethylsulfoxide added. The system was purged again with nitrogen and 84.64 grams (1.04 mole) of 49.15% aqueous sodium hydroxide added. The solution was heated to 110°–120°C. and water removed via the toluene/water azeotrope. After complete dehydration (approximately 4-5 hours), toluene was removed until the pot temperature reached 135°C.

A concentrated solution of Aroclor 5460 (274 grams) (0.5 mole) in 250 ml. of hot toluene was added via an addition funnel. The remaining toluene was then distilled off. The pot was heated to 160°–165°C. and maintained 2 hours, before cooling to room temperature. The recovery was performed as described above.

ACRYLAMINE V DERIVED FROM PHENOL-FORMALDEHYDE-ANILINE RESIN (PFAR) AND AROCLOR 5460 the phenol-formaldehyde-aniline resin was first prepared by adding an aqueous solution of formaldehyde (1.25 moles) to a vigorously stirred mixture of phenol (2 moles) and aniline (1 mole) at a temperature of about 95°–100°C. over a 45 minute period. The heterogeneous reaction mixture was refluxed for 1 hour (102°C.) and then was slowly heated to 180°C. while a mixture of water and organic materials was allowed to distill at atmospheric pressure. The temperature was maintained at 175°–180°C. for 30 minutes, then the pressure was gradually reduced with further collection of distillate. After 10 minutes at 180°C. (pot temperature) and 3 mm. pressure, the distillation had ceased. The pale orange residue was extremely viscous even at 180°C. and upon cooling to room temperature became a brittle glass. The hydroxyl equivalent of this phenol-formaldehyde-aniline resin was 284. Sixty-five grams of this product was then used to prepare Arylamine V by reaction with Aroclor 4465 as described below.

To a 1 liter, 4 neck flask, equipped with a thermometer, $N_2$ purge, mechanical stirrer, condenser and Barrett tube was charged 65 g. PFAR (0.284 OH equivalents) prepared by the condensation of phenol-formaldehyde-aniline (2:1.25:1 ratio), 71 g. Aroclor 4465 (0.142 moles) and 200 ml toluene. The solution was purged with nitrogen and 250 ml of dimethyl sulfoxide was added. Heat was applied until reflux (155°C.) was attained, whereupon 23.07 g. (0.284 mole) of 49.23% sodium hydroxide solution was added dropwise over 1 hour.

Dehydration was completed in 2 hours, after which the toluene was removed. The solution was then stirred 1 hour at 165°C., cooled, filtered and isolated via coagulation in a 10:1 ratio of water containing 0.2% NaOH and 1% $Na_2SO_3$.

The yield of product was 123 grams. An amine equivalent weight of 387 was recorded for the product.

ARYLAMINE VI DERIVED FROM PHENOL-FORMALDEHYDE-ANILINE RESIN (PFAR) AND HEXACHLOROBENZENE

A phenol-formaldehyde-aniline resin/hexachlorobenzene etheramine having the idealized formula:

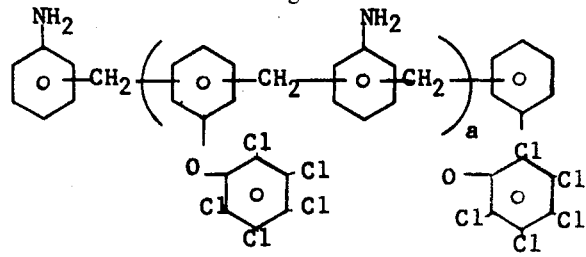

where $a$ is an integer having values of 0 to about 5 was prepared by condensing a phenol-formaldehyde-aniline resin with hexachlorobenzene.

The phenol-formaldehyde-aniline resin was first prepared by adding an aqueous solution of formaldehyde (409.01g.; 13.62 moles) to a vigorously stirred mixture of phenol (994.45g.; 10.62 moles) and aniline (988.93g.; 10.62 moles) contained in a 3-neck, round-bottom reaction flask, equipped with a stirrer, thermometer and reflux condenser. The heterogeneous mixture was refluxed for 1 hour at 102°C. The flask was then equipped for distillation and the reactants slowly heated to 180°C. while a mixture of water and organic materials was permitted to distill at atmospheric pressure. The temperature was maintained at 175°–180°C. for 30 minutes. The pressure was then gradually reduced with further collection of distillate. After 10 minutes at 180°C. (pot temperature) and 3 mm. pressure, distillation ceased. The pale orange residue was extremely viscous at 180°C. and upon cooling to room temperature it became a brittle glass.

A yield of 71% of phenol-formaldehyde-aniline resin was obtained. This product had an amine equivalent weight of 211 and a hydroxyl equivalent of 202.

The etheramine was synthesized by charging a 5-liter, 4-neck flask, equipped with a thermometer, nitrogen purge, mechanical stirrer, condenser and Barrett tube with:

606 g. of the phenol-formaldehyde-aniline resin prepared above
726 g. hexachlorobenzene
800 ml. xylene
1 liter dimethylsulfoxide The mixture was sparged with nitrogen and heated to reflux. At reflux, 243.5 g. of 49.23% aqueous sodium hydroxide solution (3.0 mole) was added over a one hour period while concurrently removing the water via the xylene-water azeotrope.

Dehydration was completed in two hours and then followed by the removal of the xylene until the pot temperature reached 165°C. The solution was stirred for 1 hour at 165°C. cooled and the product isolated via coagulation in a 5:1 volume ratio of water containing 0.2% sodium hydroxide and 1% sodium sulfite. After slurrying the filtered product in fresh water, filtration and drying at 70°C. under vacuum afforded a yield of 1148 grams of etheramine having a m.p. of 96°–105°C. and an amine equivalent of 443 g./$NH_2$.

EXAMPLE 1

The foam composition given below was prepared and foamed according to the general polyurethane foam procedure described above.

| Ingredient | Amount, Parts by Weight |
|---|---|
| NIAX 31-28[a] | 20 |
| Polyol LC-27[b] | 80 |
| Arylamine III | 3.0 |
| Water | 2.7 |
| Dimethylbenzyl amine | 0.55 |
| Dimethylcyclohexyl amine | 0.20 |
| L-78[c] | 1.0 |
| TCPA[d] | 34.4 (100 I) |

[a] A commercially available polymer/polyol prepared by polymerizing approximately 20 weight percent of acrylonitrile in polyethylene polypropylene oxide triol produced from ethylene oxide and propylene oxide and glycerine and having a molecular weight of about 5000.
[b] An adduct of glycerine with a mixture of ethylene oxide and propylene oxide having a molecular weight of about 6250 and an hydroxyl number of about 27.
[c] A commercially available low molecular weight surfactant copolymer of methyl silicone and methoxy vinyl triglycol.
[d] A tolylene diisocyanate residue product containing free tolylene diisocyanate biurets and ureas available commercially from du Pont de Nemours Co.

The foam produced in Example 1 was evaluated by standard foam test procedures. These results are presented in Table I.

These data, particularly, the ILD 25 and ILD 65 data show the utility of this formulation for producing resilient foams.

TABLE I

| Test | Result |
|---|---|
| Porosity (crushed) | 82.3 cu.ft./min./ft.$^2$ |
| Resiliency (ball rebound) | 56.0% |
| ILD 25 | 25.6 pounds |
| ILD 65 | 77.5 pounds |
| ILD 25 Return value (hysteresis) | 19.5% |
| % Return | 76.2 |
| Load Ratio (65ILD)/(25ILD) | 3.03 |
| Density | 2.57 pounds/cu.ft. |
| CS 50% | 57.5% |
| CS 75% | 88.7% |
| Tensile Strength | 18.8 psi |
| Elongation | 185% |
| Tear | 2.87 pounds/lineal inch |
| 5 Hour humid age load loss | 6.44% |
| Basal cell | Good |
| Exit | 188 seconds |
| POP | 230 seconds |

CONTROL A

Example 1 was repeated with the exception that no Arylamine III was employed in the foam composition and with the isocyanate content held constant at 100 index (degree of stoichiometry). The resultant polyurethane foam had significantly lower ILD 65 and ILD 25 values as well as a lower tear strength.

EXAMPLE 2

The procedure used for Example 1 was repeated with the following formulation.

| Ingredient | Amount, Parts by weight |
|---|---|
| NIAX 31-28 | 20 |
| Polyol LC-27 | 80 |
| Arylamine III | 5.0 |
| Water | 2.7 |
| Dimethylbenzyl amine | 0.55 |
| Dimethylcyclohexyl amine | 0.20 |
| L-78 | 1.0 |
| TCPA | 34.9 (100I) |

The foams produced in Example 2 were evaluated and the data presented in Table II. The resiliency of these foams is demonstrated by the data obtained for resiliency and % return tests.

TABLE II

| Test | Result |
|---|---|
| Basal Cell | Good |
| Exit | 165 minutes |
| POP | 210 minutes |
| Porosity (crushed) | 83.9 cu.ft./min./ft.² |
| Resiliency (ball rebound) | 51% |
| ILD 25 | 31.4 pounds |
| ILD 65 | 91.1 pounds |
| ILD 25 return value (hysteresis) | 24.0% |
| % Return | 76.4 |
| Load Ratio (65 ILD)/(25 ILD) | 2.90 |
| Density | 2.62 pounds/cu.ft. |
| CS 50 | 72.3% |
| CS 75 | 88.6% |
| Tensile Strength | 20.4 psi |
| Elongation | 178.0% |
| Tear | 2.93 pounds/lineal inch |
| 5 Hour humid age loss | 8.28% |

EXAMPLE 3

The procedure used for Example 1 was repeated with the following formulation.

| Ingredient | Amount, parts by weight |
|---|---|
| NIAX 31-28 | 20 |
| Polyol LC-27 | 80 |
| Arylamine I | 3.0 |
| Water | 2.7 |
| Dimethylbenzyl amine | 0.55 |
| Dimethylcyclohexyl amine | 0.20 |
| L-78 | 1.0 |
| TCPA | 34.4 (100I) |

The foams produced in Example 3 were evaluated and the data presented in Table III. The resiliency of these foams is demonstrated by the values obtained for resiliency and % return tests.

TABLE III

| Test | Result |
|---|---|
| Basal Cell | Good |
| Exit | 175 minutes |
| POP | 225 minutes |
| Porosity (crushed) | 93.6 cu.ft./min./ft.² |
| Resiliency (ball rebound) | 56% |
| ILD 25 | 28.8 pounds |
| ILD 65 | 82.8 pounds |
| ILD 25 return value (hysteresis) | 21.7% |
| % Return | 75.4 |

TABLE III-Continued

| Test | Result |
|---|---|
| Load Ratio (65 ILD)/(25 ILD) | 2.98 |
| Density | 2.61 pounds/cu.ft. |
| CS 50 | 60.7% |
| CS 75 | 95.9% |
| Tensile Strength | 19.1 psi |
| Elongation | 192% |
| Tear | 2.68 pounds/lineal inch |
| 5 Hour humid age loss | 8.76% |

EXAMPLE 4

The procedure used for Example 1 was repeated with the following formulation.

| Ingredient | Amount, parts by weight |
|---|---|
| NIAX 31-28 | 20 |
| Polyol LC-27 | 80 |
| Arylamine I | 5.0 |
| Water | 2.7 |
| Dimethylbenzyl amine | 0.55 |
| Dimethylcyclohexyl amine | 0.20 |
| L-78 | 1.0 |
| TCPA | 34.9 (100I) |

The foams produced in Example 4 were evaluated and the data presented in Table IV. The utility of this formulation for producing resilient polyurethane foams was demonstrated by the enhanced ILD values and also tear strength data in Table IV.

TABLE IV

| Test | Result |
|---|---|
| Porosity (crushed) | 93.6 cu.ft./min./ft.² |
| Resiliency (ball rebound) | 51% |
| ILD 25 | 33.8 pounds |
| ILD 65 | 100.0 pounds |
| ILD 25 return value (hysteresis) | 24.0% |
| % Return | 71.1 |
| Load Ratio (65 ILD)/(25 ILD) | 2.96 |
| Density | 2.69 pounds/cu.ft. |
| CS 50 | 73.5% |
| CS 75 | 98.4% |
| Tensile Strength | 22.6 psi |
| Elongation | 191.0% |
| Tear | 3.12 pounds/lineal inch |
| 5 Hour humid age loss | 10.9% |
| Basal Cell | Good |
| Exit | 170 minutes |
| POP | 210 minutes |

EXAMPLE 5

The procedure used for Example 1 was repeated with the following formulation.

| Ingredient | Amount, parts by weight |
|---|---|
| NIAX 31-28 | 20 |
| Polyol LC-29[(1)] | 80 |
| Arylamine I | 3.0 |
| Water | 2.7 |
| Dimethylbenzyl amine | 0.55 |
| Dimethylcyclohexyl amine | 0.20 |

-Continued

| Ingredient | Amount, parts by weight |
|---|---|
| TCPA | 34.68 (100I) |

(1) An adduct of glycerine with a mixture of ethylene oxide and propylene oxide having a molecular weight of about 5800 and an hydroxyl number of about 29.

The foams produced by the formulation of Example 5 were evaluated and the data delineated in Table V. The utility of this formulation for producing resilient polyurethane foams was demonstrated by the enhanced ILD values and tear strength data of Table V.

TABLE V

| Test | Result |
|---|---|
| Porosity (crushed) | 115 cu.ft./min/ft.$^2$ |
| Resiliency (ball rebound) | 64% |
| ILD 25 | 25.6 pounds |
| ILD 65 | 80.6 pounds |
| ILD 25 return value (hysteresis) | 20.0% |
| % Return | 78.2 |
| Load Ratio (65 ILD)/(25 ILD) | 3.07 |
| Density | 2.38 pounds/cu.ft. |
| CS 50 | 28.7% |
| CS 75 | 88.0% |
| Tensile Strength | 18.1 psi |
| Elongation | 178.0% |
| Tear | 2.55 pounds/lineal inch |
| Basal Cell | Good |
| Exit | 184 minutes |
| POP | 255 minutes |

EXAMPLE 6

The procedure used for Example 1 was repeated with the following formulation

| Ingredient | Amount, parts by weight |
|---|---|
| NIAX 31-28 | 20 |
| Polyol LC-29 | 80 |
| Arylamine I | 5.0 |
| Water | 2.7 |
| Dimethylbenzyl amine | 0.55 |
| Dimethylcyclohexyl amine | 0.20 |
| TCPA | 35.42 (100I) |

The foams produced in Example 6 were evaluated and the data presented in Table VI. The utility of this formulation for producing resilient polyurethane foams was demonstrated by the enhanced ILD values and tear strength data in Table VI.

TABLE VI

| Test | Result |
|---|---|
| Porosity (crushed) | 109 cu.ft./min./ft.$^2$ |
| Resiliency (ball rebound) | 69% |
| ILD 25 | 29.8 pounds |
| ILD 65 | 90.6 pounds |
| ILD 25 return value (hysteresis) | 22.1% |
| % Return | 74.1 |
| Load Ratio (65 ILD)/(25 ILD) | 3.04 |
| Density | 2.41 pounds/cu.ft. |
| CS 50 | 40.5% |
| CS 75 | 80.5% |
| Tensile Strength | 20.1 psi |
| Elongation | 180.0% |
| Tear | 2.83 pounds/lineal inch |

TABLE VI-Continued

| Test | Result |
|---|---|
| Basal Cell | Good |
| Exit | 179 minutes |
| POP | 250 minutes |

EXAMPLE 7

The procedure used for Example 1 was repeated with the following formulation.

| Ingredient | Amount, parts by weight |
|---|---|
| NIAX 31-28 | 20 |
| Polyol 11-27 | 80 |
| Arylamine IV | 3.0 |
| Water | 2.7 |
| Triethylenediamine (33% solution in dipropylene glycol) | 0.60 |
| Bis-dimethylamino ether (70% solution in dipropylene glycol) | 0.20 |
| Triethylamine | 0.15 |
| DC-200$^{(1)}$ | 0.10 |
| TDI/TRR$^{(2)}$ | 34.02 (100I) |

(1) Low molecular weight poly(methyl silicone) oil having a viscosity of 5 centistokes available from Dow Corning Co.
(2) A 50/50 mixture of toluene diisocyanate and the residue of toluene diisocyanate manufacture containing biurets and ureas.

The foams produced by the formulation of Example 7 were evaluated and the data obtained delineated in Table VII. The utility of this formulation for producing resilient polyurethane foams was demonstrated by the enhanced ILD values and tear strength data of Table VII.

TABLE VII

| Test | Result |
|---|---|
| Porosity (crushed) | 125 cu.ft./min./ft.$^2$ |
| Resiliency | 59% |
| ILD 25 | 26.2 pounds |
| ILD 65 | 74.8 pounds |
| ILD 25 return value (hysteresis) | 20.2% |
| % Return | 77.1 |
| Load Ratio (65 ILD)/(25 ILD) | 2.86 |
| Density | 2.41 pounds/cu.ft. |
| CS 50 | 24.4% |
| CS 75 | 41.0% |
| Tensile Strength | 23.9 psi |
| Elongation | 241.0% |
| Tear | 3.91 pounds/lineal inch |
| 5 Hour humid age loss | 24.8% |
| Exit | 115 minutes |
| POP | 155 minutes |
| Basal Cell | Fair |

CONTROL B

Example 7 was repeated with the exception that no Arylamine IV was used in the foam composition and with the isocyanate content held constant at 100 index (degree of stoichiometry). The resultant polyurethane foam had significantly lower ILD 65 and ILD 25 values as well as a lower tear strength.

EXAMPLE 8

The procedure used for Example 1 was repeated with the following formulation.

| Ingredient | Amount parts by weight |
| --- | --- |
| NIAX 31-28 | 20 |
| Polyol 11-27 | 80 |
| Arylamine V | 3.0 |
| Water | 2.7 |
| Triethylenediamine (33% solution in dipropylene glycol) | 0.60 |
| Bis-dimethylaminoethyl ether (70% solution in dipropylene glycol) | 0.20 |
| Triethylamine | 0.15 |
| DC-200 | 0.10 |
| TDI/TRR | 34.35 (100I) |

The foams produced by the formulation of Example 8 were evaluated and the data obtained delineated in Table VIII. The utility of this formulation for producing resilient, polyurethane foams was demonstrated by the enhanced ILD values and tear strength data of Table VIII.

TABLE VIII

| Test | Result |
| --- | --- |
| Porosity (crushed) | 106.5 cu.ft./min./ft.$^2$ |
| Resiliency | 64% |
| ILD 25 | 25.3 pounds |
| ILD 65 | 71.3 pounds |
| ILD 25 return value (hysteresis) | 20.2% |
| % Return | 79.9 |
| Load Ratio (65 ILD)/(25 ILD) | 2.82 |
| Density | 2.35 pounds/cu.ft. |
| CS 50 | 19.6% |
| CS 75 | 18.3% |
| Tensile Strength | 20.9 psi |
| Elongation | 20% |
| Tear | 3.08 pounds/lineal inch |
| 5 Hour humid age loss | 18.2% |
| Exit | 88 minutes |
| POP | 140 minutes |
| Basal Cell | Good |

EXAMPLE 9

The procedure used for Example 1 was repeated with the following formulation.

| Ingredient | Amount, parts by weight |
| --- | --- |
| NIAX 31-28 | 20 |
| Polyol 11-27 | 80 |
| Arylamine V | 5.0 |
| Water | 2.7 |
| Triethylenediamine (33% solution in dipropylene glycol) | 0.60 |
| Bis-dimethylamine ether (70% solution in dipropylene glycol) | 0.20 |
| Triethylamine | 0.15 |
| DC-200 | 0.10 |
| TDI/TRR | 34.85 (100I) |

The foams produced by the formulation of Example 9 were evaluated and the data obtained delineated in Table IX. The utility of this formulation for producing resilient polyurethane foams was demonstrated by the enhanced ILD values and tear strength data of Table IX.

TABLE IX

| Test | Result |
| --- | --- |
| Porosity (crushed) | 115 cu.ft./min./ft.$^2$ |
| Resiliency | 62% |
| ILD 25 | 29.2 pounds |
| ILD 65 | 82.9 pounds |
| ILD 25 return value (hysteresis) | 22.8% |
| % Return | 78.1 |
| Load Ratio (65 ILD)/(25 ILD) | 2.84 |
| Density | 2.38 pounds/cu.ft. |
| CS 50 | 22.1% |
| CS 75 | 40.2% |
| Tensile Strength | 21.0 psi |
| Elongation | 199% |
| Tear | 2.86 pounds/lineal inch |
| 5 Hour humid age loss | 15.9% |
| Exit | 99 minutes |
| POP | 136 minutes |
| Basal Cell | Good |

EXAMPLE 10

Using the general polyurethane foam procedure described previously, foam compositions were prepared as in Example 1 but using Arylamine VI in place of Arylamine III at levels of 2, 4 and 8 parts by weight per 100 parts by weight of polyol. The utility of these formulations for producing resilient polyurethane foams was demonstrated by enhanced 65% ILD values of 92 pounds/50 in.$^2$ and 115 pounds/50 in.$^2$. Furthermore, the superiority of these formulations over those of the prior art where methylene bis(ortho-chloraniline) was used as the amine additive in the same polyurethane formulation was demonstrated by a plot of 65% ILD values versus parts by weight of etheramine. The Arylamine VI formulations showed linear plots while the methylene bis(orthochloraniline) formulations did not.

Although the invention has been described in its preferred forms with a certain degree of particularity, is understood that the present disclosure of the preferred forms has been made only by way of example and that numerous changes may be resorted to without departing from the spirit and scope of the invention.

What is claimed is:

1. A load-bearing, high resiliency polyurethane foam produced by inter-reacting a mixture of at least one organic polyisocyanate and at least one polyol in the presence of a blowing agent with about 0.5 to about 20 percent by weight, based on the weight of polyol, of an arylamine having a formula selected from the group consisting of

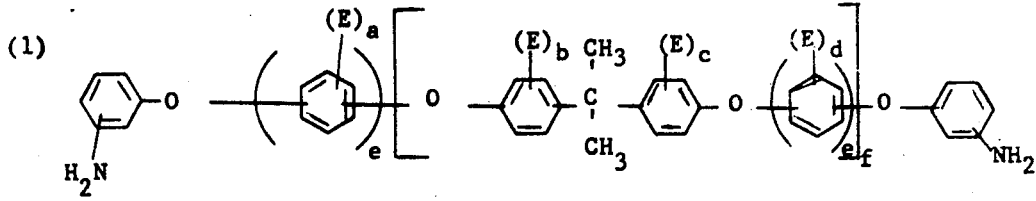

and (2) 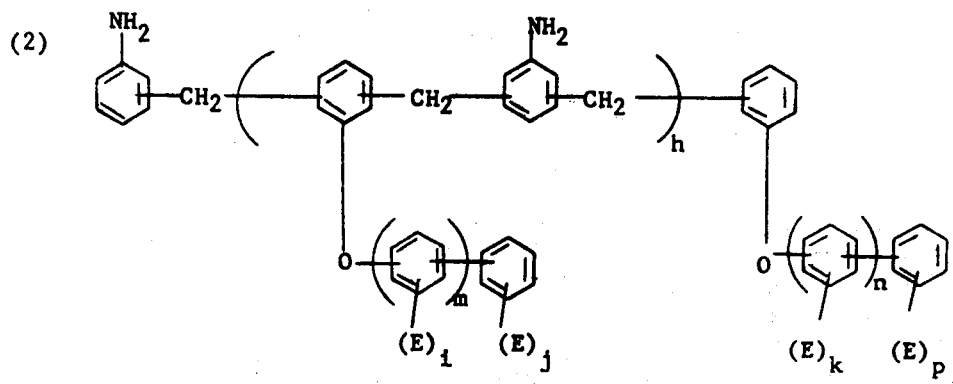

wherein E is a halogen selected from the group consisting of fluorine, chlorine and bromine, $a$, $b$, $c$, $d$, $e$, $i$, and $k$ are each integers having values of 1 to 4, $m$ and $n$ are integers having values of 0 to 4, $j$ and $p$ are integers having values of 1 to 5, $f$ is an integer having values of 0 to 2, and $h$ is an integer having average values of 0 to about 5.

2. Product claimed in claim 1 wherein the arylamine is represented by formula (1).

3. Product claimed in claim 2 wherein $f$ is O and E is chlorine.

4. Product claimed in claim 3 wherein $e$ is 1.
5. Product claimed in claim 3 wherein $e$ is 2.
6. Product claimed in claim 3 wherein $e$ is 3.
7. Product claimed in claim 3 wherein $e$ is 4.
8. Product claimed in claim 1 wherein $f$ is 1.
9. Product claimed in claim 8 wherein $e$ is 1.
10. Product claimed in claim 1 wherein the arylamine is represented by formula (2).

11. Product claimed in claim 10 wherein E is chlorine.
12. Product claimed in claim 11 wherein each of $m$ and $n$ is O.
13. Product claimed in claim 11 wherein each of $m$ and $n$ is 1.
14. Product claimed in claim 11 wherein each of $m$ and $n$ is 2.
15. Product claimed in claim 11 wherein each of $m$ and $n$ is 3.
16. Product claimed in claim 1 wherein $h$ is about 1.
17. Product claimed in claim 1 wherein the weight percent of arylamine is about 3 to about 5.
18. Product claimed in claim 1 wherein the polyol is polypropylene oxide triol.
19. Product claimed in claim 1 wherein the polyisocyanate is a tolylene diisocyanate.
20. Product claimed in claim 1 wherein the blowing agent is water.

* * * * *